United States Patent
Kamat et al.

(10) Patent No.: US 9,697,647 B2
(45) Date of Patent: Jul. 4, 2017

(54) BLENDING REAL AND VIRTUAL CONSTRUCTION JOBSITE OBJECTS IN A DYNAMIC AUGMENTED REALITY SCENE OF A CONSTRUCTION JOBSITE IN REAL-TIME

(71) Applicant: The Regents of the University of Michigan, Ann Arbor, MI (US)

(72) Inventors: Vineet R. Kamat, Ann Arbor, MI (US); Suyang Dong, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 14/698,544

(22) Filed: Apr. 28, 2015

(65) Prior Publication Data

US 2015/0310669 A1    Oct. 29, 2015

Related U.S. Application Data

(60) Provisional application No. 61/985,262, filed on Apr. 28, 2014.

(51) Int. Cl.
*G06T 19/00* (2011.01)
*G06T 11/00* (2006.01)
(Continued)

(52) U.S. Cl.
CPC ........ *G06T 19/006* (2013.01); *G06T 2200/28* (2013.01)

(58) Field of Classification Search
None
See application file for complete search history.

(56) References Cited

U.S. PATENT DOCUMENTS 5,748,199 A * 5/1998 Palm ................. H04N 13/0014
                                                      345/419
6,414,679 B1 * 7/2002 Miodonski .......... G06F 17/5004
                                                      345/420
(Continued)

OTHER PUBLICATIONS

Bleiweiss, A., Werman, M.: Fusing Time-of-Flight Depth and Color for Real-Time Segmentation and Tracking. In: Kolb, A., Koch, R. (eds.) Dyn3D 2009. LNCS, vol. 5742, pp. 58-69. Springer, Heidelberg (2009).*

(Continued)

*Primary Examiner* — Kimberly A Williams
(74) *Attorney, Agent, or Firm* — Reising Ethington P.C.

(57) ABSTRACT

A method of blending at least one virtual construction jobsite object and at least one real construction jobsite object in a dynamic augmented reality scene of a construction jobsite includes several steps. One step involves capturing a depth map image via a depth sensing device, and capturing a red, green, and blue (RGB) image via an RGB image-capturing device. Another step involves registering the depth map image and the RGB image to a common coordinate system. Yet another step involves projecting the at least one virtual construction jobsite object in a scene of the construction jobsite with the use of geographical information system (GIS) data, computer-aided design (CAD) data, or both types of data, to generate the augmented reality scene of the construction jobsite. And yet another step involves removing hidden surfaces of the at least one virtual construction jobsite object in the augmented reality scene.

20 Claims, 8 Drawing Sheets

(51) Int. Cl.
*G06T 15/04* (2011.01)
*G06T 15/40* (2011.01)

(56) References Cited

U.S. PATENT DOCUMENTS

| | | | | |
|---|---|---|---|---|
| 7,068,269 | B2* | 6/2006 | Roberts | G06F 17/5004 345/419 |
| 8,705,893 | B1* | 4/2014 | Zhang | G06K 9/00201 345/418 |
| 9,330,501 | B2* | 5/2016 | Sahoo | G06T 19/006 |
| 2013/0155058 | A1* | 6/2013 | Golparvar-Fard | G06T 19/006 345/419 |
| 2013/0163883 | A1* | 6/2013 | Takemoto | G06K 9/00382 382/199 |
| 2014/0104387 | A1* | 4/2014 | Klusza | H04N 13/0207 348/46 |
| 2014/0210856 | A1* | 7/2014 | Finn | G01C 15/002 345/633 |
| 2014/0225985 | A1* | 8/2014 | Klusza | H04N 13/0207 348/43 |
| 2015/0042678 | A1* | 2/2015 | Alt | G06F 3/005 345/633 |
| 2015/0310135 | A1* | 10/2015 | Forsyth | G06F 17/5004 703/1 |

OTHER PUBLICATIONS

Reulke, R.: 'Combination of distance data with high resolution images', Paper presented in the Proceedings of the Image Engineering and Vision Metrology (IEVM). (2006).*

Salinas, Carlota et al. "A New Approach for Combining Time-of-Flight and RGB Cameras Based on Depth-Dependent Planar Projective Transformations." Sensors (2015).*

* cited by examiner

BLENDING REAL AND VIRTUAL CONSTRUCTION JOBSITE OBJECTS IN A DYNAMIC AUGMENTED REALITY SCENE OF A CONSTRUCTION JOBSITE IN REAL-TIME

CROSS-REFERENCE TO RELATED APPLICATION

This application claims the benefit of U.S. Provisional Application No. 61/985,262 filed Apr. 28, 2014, the entire contents of which are hereby incorporated by reference.

GOVERNMENT LICENSE RIGHTS

This invention was made with government support under CMS0448762, CMMI1160937, and CMMI0927475 awarded by the National Science Foundation. The government has certain rights in the invention.

TECHNICAL FIELD

This disclosure relates generally to augmented reality (AR), and more particularly to an AR scene of a construction jobsite with real and virtual construction jobsite objects such as buried utilities, construction equipment, building structures, as well as other objects.

BACKGROUND

Augmented reality (AR) scenes include real and virtual objects usually interacting with each other in some way. An AR scene of a construction jobsite like an excavation jobsite, for instance, might include real and/or virtual buried utilities, construction equipment, building structures, and workers. In these applications, a virtual representation of a buried utility can be superimposed over a real-world view of the construction jobsite. An operator of an excavator could then view the AR scene of the excavation jobsite and the virtual buried utility to more readily avoid unintended impact with the real buried utility while digging in the ground that covers the real buried utility. Without the virtual representation, the buried utility would otherwise be hidden from sight underneath the ground.

One challenge involves blending the real and virtual objects in the AR scene as convincingly as possible so that an observer, such as the excavator operator, does not perceive a significant distinction between the virtual buried utility and a real-world object. Spatial accuracy and graphical credibility are two factors that influence whether the distinction is obscured to a desired degree. An AR scene that lacks a suitable level of spatial accuracy and graphical credibility, for instance, results in a virtual object that appears to simply float over the real-world view rather than blending with real objects in the real-world view.

SUMMARY

According to an embodiment, a method of blending at least one virtual construction jobsite object and at least one real construction jobsite object in a dynamic augmented reality scene of a construction jobsite in real-time includes several steps. One step involves capturing a depth map image of the construction jobsite and of the at least one real construction jobsite object via a depth sensing device. Another step involves capturing a red, green, and blue (RGB) image of the construction jobsite and of the at least one real construction jobsite object via an RGB image-capturing device. Yet another step involves registering the depth map image and the RGB image of the construction jobsite and of the at least one real construction jobsite object to a common coordinate system. And yet another step involves projecting the at least one virtual construction jobsite object in a scene of the construction jobsite using geographical information system (GIS) data, computer-aided design (CAD) data, or both GIS data and CAD data, in order to generate the augmented reality scene of the construction jobsite. Another step involves removing hidden surfaces of the at least one virtual construction jobsite object in the augmented reality scene of the construction jobsite based on depth distance data of the depth map image of the at least one real construction jobsite object, and based on the GIS data, CAD data, or both GIS and CAD data of the projected at least one virtual construction jobsite object.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION

Figure 8:
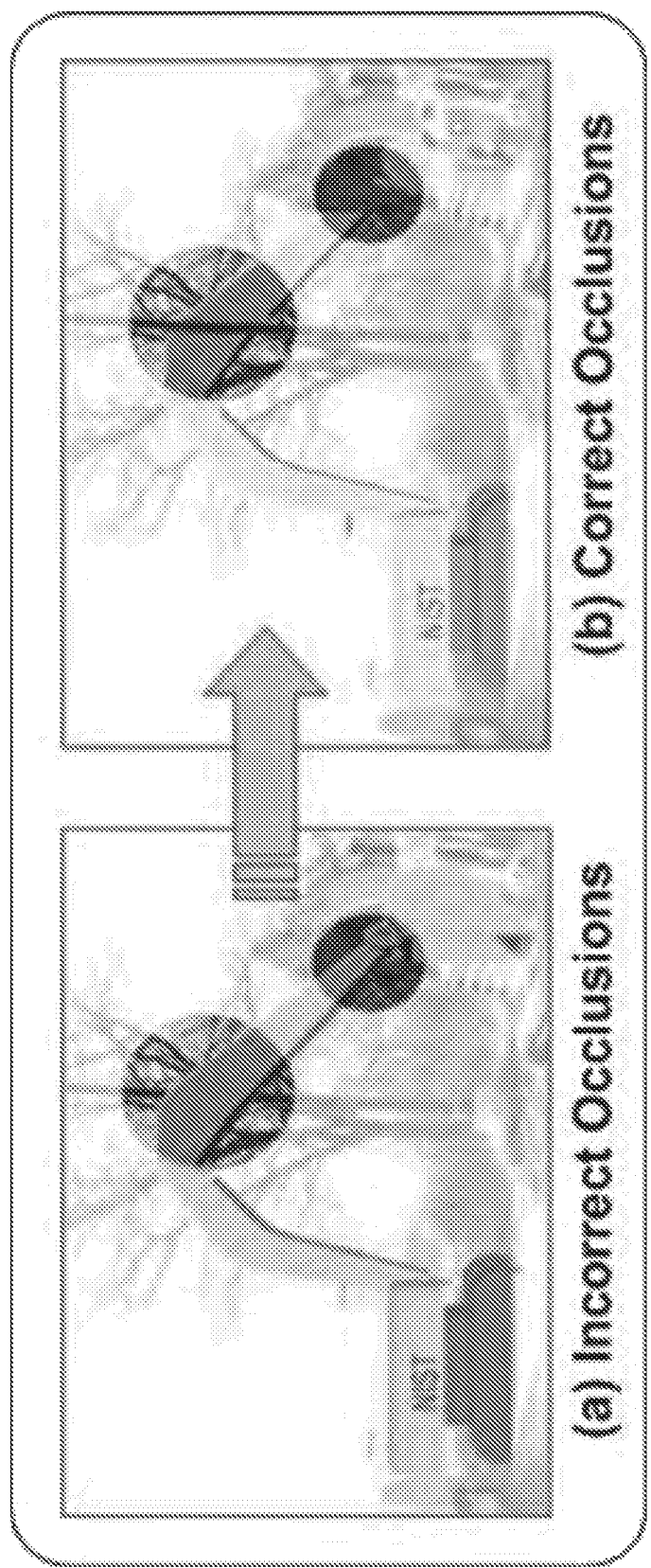
FIG. 8 is a diagrammatic representation of an embodiment of a dynamic augmented reality scene of a construction jobsite.

Referring to the drawings, the figures depict portions of a method of blending real and virtual construction jobsite objects in a dynamic augmented reality (AR) scene of a construction jobsite in real-time. The construction jobsite can be an excavation jobsite, a trenching jobsite, a drilling operation jobsite, or another sort of jobsite. And the construction jobsite objects can include buried utilities such as fluid and gas pipes and electrical cables, construction equipment such as excavators and backhoe loaders and cranes, building structures, and workers. A buried utility is an example of a static construction jobsite object, and an excavator is an example of a dynamic construction jobsite object. FIG. 8 illustrates a non-limiting example of an AR scene of a construction site, wherein a virtual excavator model is blended into a construction jobsite that includes real constructions jobsite objects such as, for example, trees.

The AR scene may be displayed in a cabin of the construction equipment for ready availability to an operator of the construction equipment, or may be displayed somewhere else.

Furthermore, the method detailed in this description is dynamic in the sense that as an observer of the AR scene freely navigates the accompanying real-world scene, the relative depths between real and virtual objects in the AR scene are changing with the observer's movement and time. The method detailed in this description overcomes challenges when blending real and virtual objects in an AR scene so that an observer does not perceive a significant distinction between the real and virtual objects, and virtual objects in the AR scene do not appear to merely float over the real-world view. This is accomplished via an occlusion algorithm and process in which different functions are performed, as described below. The occlusion algorithm is designed to be generic and scalable. Moreover, compared to previous AR blending efforts, the method detailed in this description has been shown to be more effective in both indoor and outdoor real-world environments, is effective regardless of spatial relationships among real and virtual objects, and is faster and can work effectively in real-time.

The method detailed in this description involves an algorithm and process with steps that can be implemented in a computer program product and/or a controller having instructions embodied in a computer readable medium with a non-transient data storage device. The steps can themselves utilize various algorithms, models, formulae, representations, and other functionality. The computer program product and/or controller can have hardware, software, firmware, or other like components configured and programmed to perform the steps, and can employ memory components, processing components, logic components, lookup tables, routines, modules, data structures, and other like components. Further, the computer program and/or controller can be provided with instructions in source code, object code, executable code, or other formats. And while this description details examples of algorithms, models, formulae, and representations, skilled artisans will appreciate that other algorithms, models, formulae, and representations may be used as suitable alternatives. The computer program product and/or controller may be one or more discrete components or may be integrated into, for instance, a piece of construction equipment or another construction jobsite machine.

In general, the embodiment of the method detailed in this description uses a depth sensing device 12 and a red, green, and blue (RGB) image-capturing device 14, and employs the Open Graphics Library (OpenGL) Shading Language (GLSL) programming language and render to texture (RTT) techniques. The depth sensing device 12 captures a depth map image 16 of the real construction jobsite and of one or more real construction jobsite objects. The depth sensing device 12 can be a real-time time-of-flight (TOF) camera. One commercial example of a TOF camera is the product known as Kinect that is offered by Microsoft Corporation headquartered in Redmond, Wash. U.S.A. Of course, other TOF camera products are possible. The RGB image-capturing device 14 captures an RGB image 18 of the real construction jobsite and of the real construction jobsite object(s). The RGB image-capturing device 14 can be a video camera. In some embodiments, the depth sensing device 12 and RGB image-capturing device 14 could be integrated into a single device that performs both of their functions, and hence the devices 12, 14 need not necessarily be separate and discrete components. Further, a camera of the OpenGL application programming interface (API) may be employed in this embodiment to project one or more virtual construction jobsite objects in an AR scene of the real construction jobsite. Other APIs may be employed in other embodiments. The projection can utilize geographical information system (GIS) data and/or computer-aided design (CAD) data in order to generate the visuals of the virtual construction jobsite object(s). The GIS data can include data to represent building footprint areas, lot boundaries, buried utilities, as well as other objects. The GIS data may be stored in a single object relational database management system (DBMS). The CAD data can include data to represent construction equipment, workers, temporary building structures, as well as other objects.

Figure 6:
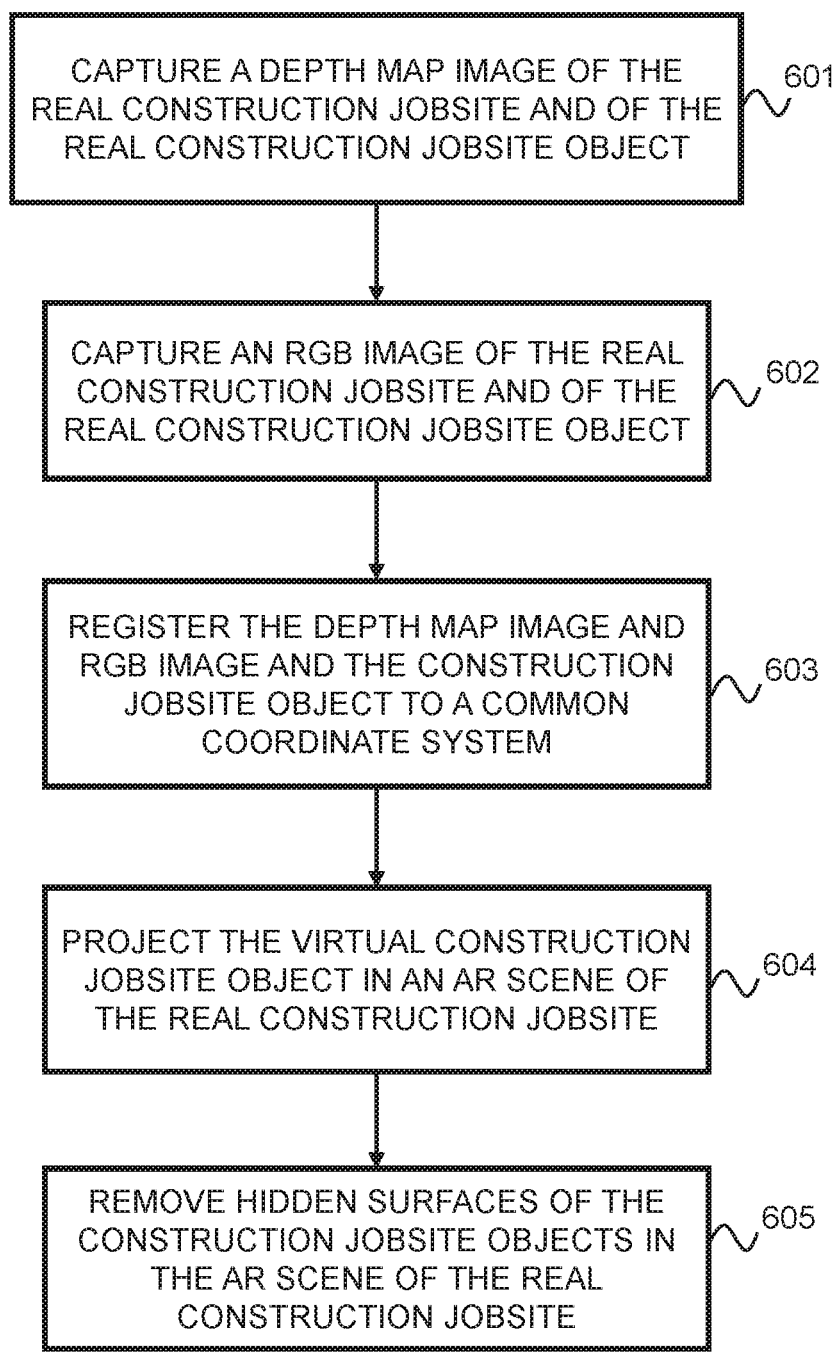
FIG. 6 illustrates a flowchart of a method according to an exemplary embodiment of the present invention.

Referring to FIG. 6, the method detailed in this description includes multiple steps. The steps are described below with varying degrees of specificity, and need not necessarily be carried out exactly as described, nor in the same order in which the steps are described. In general, the steps include capturing images that include a depth map image of the real construction jobsite (S601), capturing an RGB image of the real construction jobsite and the real construction jobsite object (S602), registering the captured images to a common coordinate system (S603), projecting the virtual construction jobsite object(s) (S604), and removing hidden surfaces of the virtual construction jobsite object(s) (S605). The resulting AR scene blends virtual construction jobsite object(s) and real construction jobsite object(s) in accordance with at least some of the objectives set forth above.

1. Depth-Buffer Comparison Approach

The methodology and computing paradigm for resolving occlusion issues with an OpenGL depth-buffering method on a two-stage rendering basis are described.

1.a. Distance Data Source

Accurate measurement of the distance from the virtual construction jobsite object(s) and the real construction jobsite object(s) to an observer's eye (i.e., viewpoint) is a basis for suitable occlusion. In an outdoor real-world environment, for instance, the distance from a virtual construction jobsite object to the viewpoint can be calculated using what-is-known-as the Vincenty algorithm. In general, Vincenty's algorithm interprets the metric distance based on the geographical locations of a virtual object and user. The locations of the virtual objects are predefined by the program. For example, in a simulated construction operation, the geographical locations of virtual building components and equipment can be extracted from engineering drawings. And the location of the user can be tracked via a global positioning system (GPS).

On the other hand, a TOF camera—like the ones set forth above—can estimate the distance from a real construction jobsite object to the viewpoint by employing the time-of-flight principle which measures the time a signal travels, with well-defined speed, from the associated transmitter to the associated receiver. More specifically, a TOF camera can measure radio frequency (RF) modulated light sources with phase detectors. The modulated outgoing beam is sent out with a RF carrier, and the phase shift of the RF carrier is measured on the receiver side in order to compute the distance. Compared with traditional LIDAR scanners and stereo vision, a TOF camera can have real-time feedback with high accuracy of approximately ten millimeters (10 mm) average error in some examples. A TOF camera may be capable of capturing a complete scene with a single shot and speeds up to forty frames-per-second (40 fps); other performance specifications are possible and suitable. Certain suppression of background illumination (SBI) technology permits use of TOF cameras in both indoor and outdoor real-world environments.

1.b. Two-Stage Rendering

Figure 1:
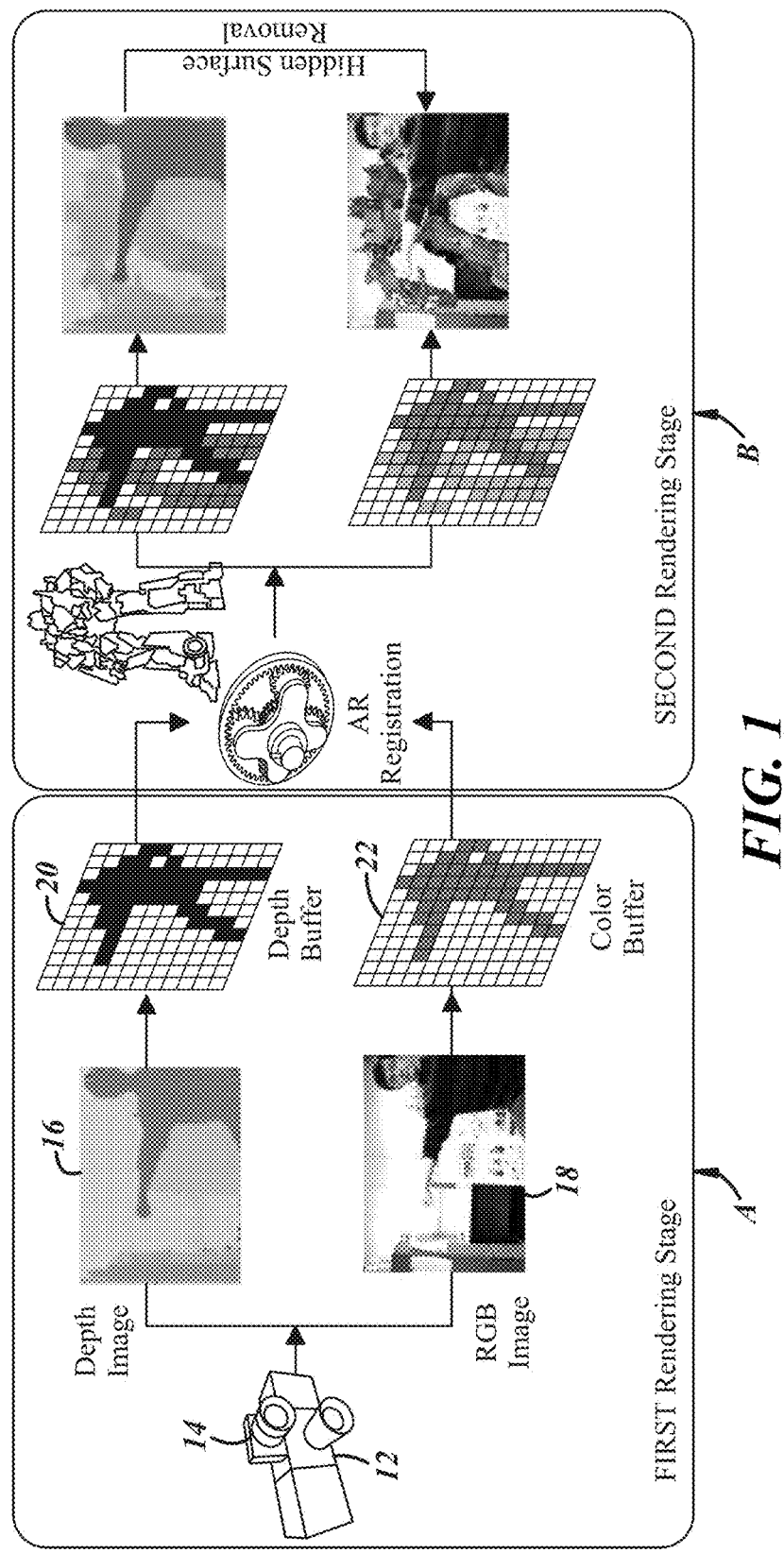
FIG. 1 is a diagrammatic representation of an embodiment of depth buffering that uses a first rendering stage and a second rendering stage.

In general, depth buffering (also known as z-buffering) is a technique for hidden-surface elimination in OpenGL and can be carried out efficiently in a graphics processing unit (GPU). A depth buffer 20 (FIG. 1) can be a two-dimensional array that may share the same resolution with a color buffer 22 and a viewport. If enabled in an OpenGL drawing stage, the depth buffer 20 maintains record of the closest depth value to an observer for each pixel. For an incoming fragment at a certain pixel, the depth buffer 20 may not be drawn unless its corresponding depth value is smaller than the previous one. If it is drawn, then the corresponding depth value in the depth buffer 20 is replaced by the smaller one. In this way, after the entire scene has been drawn, only fragments not obscured by any other fragments remain visible. Depth buffering may thus be one approach for resolving AR occlusion issues. FIG. 1 presents an embodiment of a two-stage rendering process. In a first rendering stage A, background of a real-world scene is drawn as usual but with the depth map image 16 received from the depth sensing device 12 written into the depth buffer 20 at the same time. In a second rendering stage B, virtual objects are drawn with depth-buffer testing enabled. As a result, invisible parts of the virtual objects—either hidden by a real object or another virtual object—will be suitably occluded.

1.c. Challenges with Depth-Buffering Comparison Approach

Challenges may be encountered when padding the depth buffer 20 with the depth map image 16 of the depth sensing device 12. One challenge is: after being processed via OpenGL graphics pipeline and written into the depth buffer 20, the distance between the OpenGL camera and the virtual object is no longer the physical distance. Accordingly, the distance for each pixel from the real object to the viewpoint recorded by the depth sensing device 12 might have to be processed by the same transformation model before it is written into the depth buffer 20 for comparison.

Another challenge is: the fact that there may be three cameras for rendering the AR scene. The RGB image-capturing device 14 can capture the RGB image 18 or intensity values of the real-world scene as background, and its result may be written into a color buffer 22. The depth sensing device 12 acquires the depth map image 16 of the real-world scene, and its result is written into the depth buffer 20. And the OpenGL camera projects virtual objects overtop of the real-world scene, with its results being written into both the color buffer 22 and depth buffer 20. In some cases, in order to help ensure suitable alignment and occlusion, the three cameras should share similar projection parameters. Projection parameters may include principle points and focal lengths. Even though the particular depth sensing device 12 may provide an integrated intensity image which can be aligned with the depth map image 16 by itself, the monocular color channel may compromise visual credibility. On the other hand, if an external RGB image-capturing device 14 is used, then intrinsic and extrinsic parameters of the RGB image-capturing device 14 and the depth sensing device 12 may disagree—that is, the devices 12, 14 may have different principle points, focal lengths, and distortions. Accordingly, image registration methodology may be needed in order to find correspondences between the depth map image 16 and RGB image 18. The projection parameters of the OpenGL camera may be adjustable and could therefore accommodate either the depth sensing device 12 or the RGB image-capturing device 14.

Yet another challenge is: the OpenGL pixel-drawing command can be undesirably slow when writing a two-dimensional array, i.e., the depth map image 16 into the depth buffer 20.

And yet another challenge is: the resolution of the depth map image 16 may be 200×200 in some examples, while that of the depth buffer 20 can be arbitrary depending on the resolution of the viewport. This means that interpolation between the depth map image 16 and depth buffer 20 may be needed.

2. Depth Sensing Device (TOF Camera) Raw Data Preprocessing 2.a. Preprocessing of Depth Map Image In OpenGL, viewing volume may be normalized so that all vertices' coordinates lie within the range [−1, 1] in all three dimensions. This is sometimes referred to as the canonical view volume or normalized device coordinates, which may prepare the vertices to be transformed from 3D eye space to 2D screen space. Accordingly, the z value (i.e., depth value) of a vertex may no longer be the physical distance once normalized. In order to make the distance recorded by the depth sensing device 12 comparable with that computed by the OpenGL camera, the same normalization may have to be applied to the depth map image 16 from the depth sensing device 12. The distance value recorded by the depth sensing device 12 may be referred to as $z_e$ (the metric distance from the vertices to the viewer in the viewing direction). Table 1 summarizes transformation steps that may be applied to $z_e$ before it is written to the depth buffer 20: i) clip coordinate $z_c$ (distance values in the clip space where objects outside the view volume are clipped away) is the result of transforming $z_e$ by the camera projection matrix; ii) $z_c$ divided by $w_c$ (homogenous component in the clip space) is called perspective divide that generates normalized coordinate $z_{NDC}$; iii) since the range of $z_{NDC}$ [distance values in the normalized device coordinates (NDC) space] is [−1, 1], it may have to be biased and scaled to the depth buffer range [0, 1] before it is sent to the depth buffer 20. Furthermore, in table 1, $W_c=Z_c$ and is the homogenous component in the clip coordinate; We=the homogenous component in the eye coordinate, usually equal to 1, and n and f=the near and far plane; M=matrix.

TABLE 1

| Name | Meaning | Operation | Expression | Range |
|---|---|---|---|---|
| $Z_e$ | Distance to the viewpoint | Acquired by TOF camera | | (0, +∞) |
| $Z_c$ | Clip coordinate after projection transformation | $M_{ortho} \times M_{perspective} \times [X_e Y_e Z_e W_e]^T$ | $Z_C = [Z_e \times (f + n)]/[f - n] - [2 \times f \times n \times W_e]/[f - n]$ | [−n, f] |
| $Z_{NDC}$ | Normalized device coordinate | $Z_C/W_C$ | $Z_{NDC} = (f + n)/(f - n) - (2 \times f \ast n)/[Z_e \ast (f - n)]$ | [−1, 1] |
| $Z_d$ | Value sent to depth buffer | $(Z_{NDC} + 1)/2$ | $Z_d = (f + n)/[2 \times (f - n)] - (f \times n)/[Z_e \times (f - n)] + 0.5$ | [0, 1] |

2.b. Processing of Intensity Image

This step may only be needed if the integrated image provided by the depth sensing device 12 (TOF camera) is used. The intensity image's raw color data format may be incompatible with that supported by OpenGL. Further, the intensity distribution may be biased and may have to be redistributed for improved cosmetic effect. Since unsigned byte (8 bits represents 0~255) is the data type that may be used in OpenGL for showing intensity values, the raw TOF intensity image may have to be refined in two regards. First, the raw intensity values may be spread from 1,000 to 20,000 and thus may have to be scaled to [0, 255]; second, the intensity may be represented by close contrast values. In other words, most frequent color values may only occupy a small bandwidth in the entire spectrum. Therefore, histogram equalization may be helpful in spreading out the most frequent intensity values on the spectrum for improved visual appeal. The basic idea of equalization is to linearize the cumulative distribution function (CDF) across the spectrum from 0 to 255. The transformation can be described in one example by the equation:

$$P(v) = \frac{CDF(v) - CDF\min}{(width * height) - CDF\min} * (Level-1)$$

where CDF=the cumulative distribution function of a given intensity image; v=the original intensity value of a given pixel; P(v)=the intensity value after equalization for that pixel; and Level=the total number of gray scale after equalization, 256 in the OpenGL case.

3. Depth Map Image and RGB Image Registration

One challenge to suitably resolve occlusion issues is to identify the mapping relationship between the RGB image 18 and the depth map image 16 (referred to as image registration). The depth map image 16 and RGB image 18 are registered to a common coordinate system at this stage in the process. Three example approaches are presented: i) alignment between the depth map image 16 and the intensity image captured by the depth sensing device 12 (e.g., TOF camera) may not require implicit image registration; ii) homography registration between the depth map image 16 and RGB image 18 has been investigated as an approximate approach due to its simplicity in concept and implementation; it yields suitable results within a certain range, depending on the distribution of the correspondence points; and iii) stereo registration may be a robust approach since it faithfully reflects the geometric relationship between the depth sensing device 12 (e.g., TOF camera) and the RGB image-capturing device 14.

3.a. Image Registration Between Depth Map Image and Intensity Image

Since the depth map image 16 and the intensity image can be interpreted from the homogeneous raw data source of the depth sensing device 12 (e.g., TOF camera), the images may have the same intrinsic and extrinsic parameters. Therefore, pixels in the depth map image 16 and intensity image may have a one-to-one mapping relation. No explicit registration may be required. After the preprocessing step previously described and an interpolation for higher resolution subsequently described, the depth map image 16 and intensity image may be ready to be used in the two-stage rendering process of FIG. 1.

3.b. Image Registration Between Depth Map Image and RGB Image Using Homography

In general, homography is an invertible mapping of points and lines from plane to plane, so that, for example, three points lying on the same line have their mapped points collinear. A homography matrix is a 3×3 matrix with eight unknowns. Theoretically, a homography exists between two images captured by cameras that only have pure rotation relative to each other. In other words, ideally no relative translation should be involved. But since the RGB image-capturing device 14 has a small translation to the depth sensing device 12 (e.g., TOF camera), the image registration can be approximated by the homography model.

Estimation of homography may be derived by what-is-known-as the direct linear transformation (DLT) algorithm provided a sufficient set of point correspondences. Solving eight unknowns may require four-point correspondence. If more than four pairs are available, then more accurate estimation can be acquired by minimizing certain cost functions. In this embodiment, a nonlinear homography estimation implementation is employed. In one example, an RGB image is transformed to a depth map image coordinate frame. Since it may be difficult to find identical points using the depth map image, the intensity image recorded by the depth sensing device 12 (e.g., TOF camera) with a one-to-one mapping to the depth map image may be used instead.

It may be expensive computationally to multiply each RGB image point with the homography matrix in real-time. In order to accelerate the process, the mapping relationship from the RGB image to the depth map image points may be pre-computed and stored as a lookup table. The depth value may then be bilinearly interpolated for the corresponding RGB image points on-the-fly. In this regard, parallelizing the interpolation process using render to texture (RTT) techniques is subsequently described.

3.c. Image Registration Between Depth Map Image and RGB Image Using Stereo Projection In this approach, a stereo-registration method has been shown to assign correct RGB values to each depth map image pixel. Each two-dimensional (2D) point on the depth map image is back-projected on the three-dimensional (3D) space and then re-projected onto the RGB image plane. Intrinsic and extrinsic parameters of the depth sensing device 12 (e.g., TOF camera) and the RGB image-capturing device 14 may need to be calibrated for the stereo-registration method.

3.c.i. Assign RGB Value to Depth Map Pixel

Figure 2:
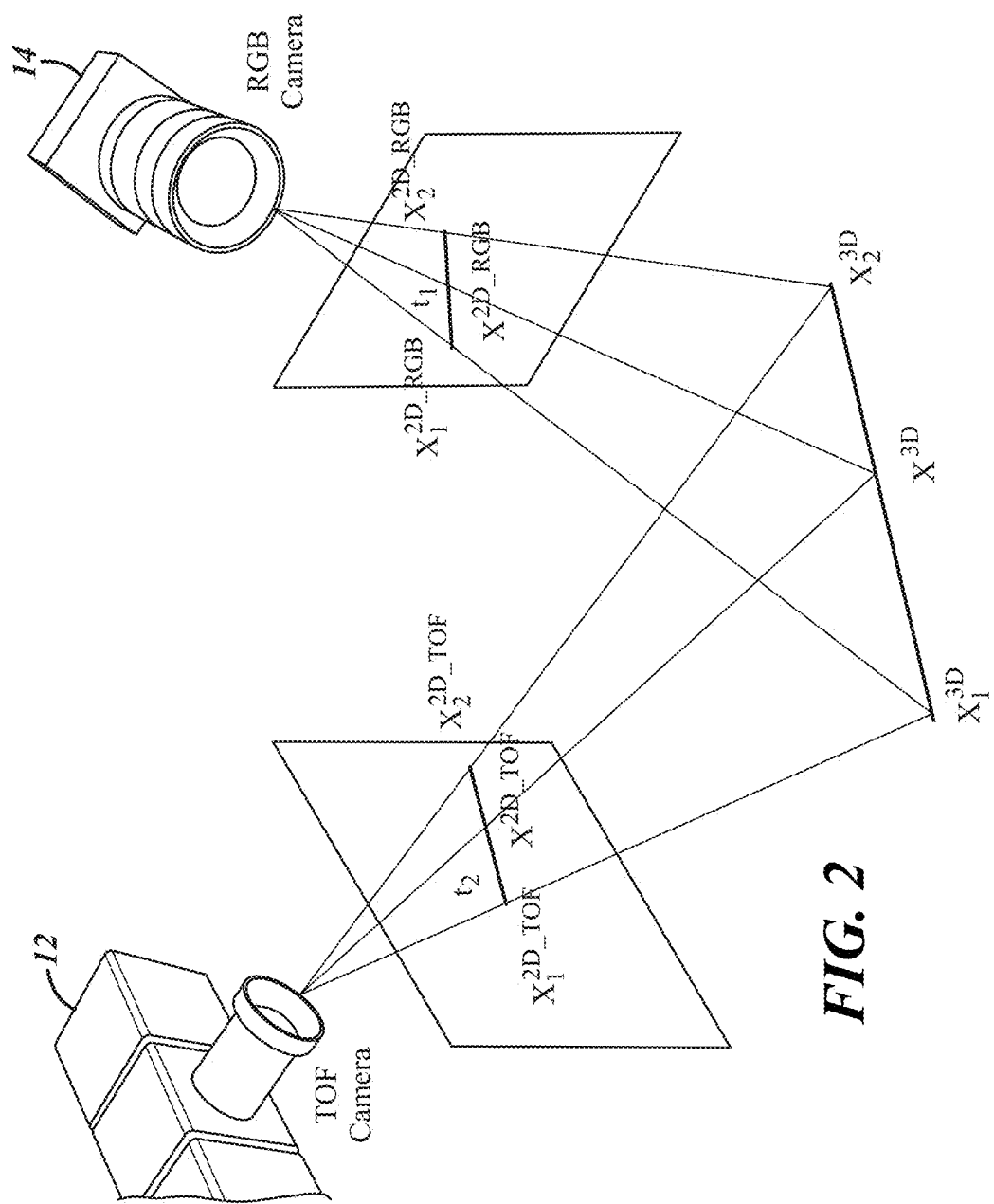
FIG. 2 is a diagrammatic representation of an embodiment of stereo registration between a depth sensing device in the form of a real-time time-of-flight (TOF) camera ("TOF Camera") and a red, green, and blue (RGB) image capturing device ("RGB Camera")

Referring to the example of FIG. 2, $X^{2D\_TOF}$ is one pixel on the depth map image. In order to find its corresponding point $X^{2D\_RGB}$ on the RGB image, $X^{2D\_TOF}$ is first back-projected to the 3D space as $X^{3D\_TOF}$ given $K^{TOF}$, the intrinsic matrix of the depth sensing device 12 (e.g., TOF camera), and its depth value $Z(X^{2D\_TOF})$, as shown in the following equation:

$$Z(X^{2DTOF})X^{2DTOF} = K^{TOF}X^{3DTOF}$$

The 3×1 vector $X^{2D\_TOF}$ is a homogeneous representation of the pixel position with the third element equal to 1 (similarly for the $X^{2D\_RGB}$). Since $X^{3D\_TOF}$ can be expressed in the coordinate system of the depth sensing device 12 (e.g., TOF camera), it may have to be transformed to $X^{3D\_RGB}$ in the coordinate system of the RGB image-capturing device 14 using the extrinsic matrix [R, T] between the devices 12, 14:

$$X^{3D\_RGB} = RX^{3D\_TOF} + T$$

where R and T=the relative rotation and translation from the TOF to the RGB image. And, $X^{3D\_RGB}$ is projected onto the RGB image plane as $X^{2D\_RGB}$ using $K^{RGB}$, the intrinsic matrix of the RGB image-capturing device 14:

$$sX^{2DRGB} = K^{RGB}X^{3DRGB}$$

where s=an unknown scale parameter. This process has been described mathematically as:

$$sX^{2DRGB} = Z(X^{2DTOF})K^{RGB}RK^{TOF-1}X^{2DTOF} + K^{RGB}T$$

The $Z(X^{2D\_TOF})$ value=the physical distance measured by the depth sensing device 12 (e.g., TOF camera), which can be known for each pixel on the depth map image 16. $K^{RGB}$, $K^{TOF}$, R, and T can be pre-calibrated. It has been found that implementation of the model described above may rely on accurate intrinsic and extrinsic calibration. One example of this is the camera_calibration and stereo_calibration SDK provided by the OpenCV library.

3.c.ii. Interpolate RGB Values for Intermediate Depth Map Image Pixels

If the depth sensing device 12 (e.g., TOF camera) has a lower resolution (e.g., 200×200), interpolation may need to be carried out if a higher resolution augmented image is to be rendered. But due to the perspective projection involved, it may not be suitable to render a 200×200 augmented image and then leave it to the texture to (bi)linearly interpolate to higher resolution, as previously described. Here, in this embodiment, $X^{2D\_TOF}$ can be an intermediate point for interpolation between $X_1^{2D\_TOF}$ and $X_2^{2D\_TOF}$ whose corresponding points are $X_1^{2D\_RGB}$ and $X_2^{2D\_RGB}$ on the RGB image. In an example, in order to assign RGB value for $X^{2D\_TOF}$, its corresponding point should be linearly interpolated on the RGB image per equation (2) below. Because $t_1 \neq t_2$, its RGB value would be unsuitably assigned if it was linearly interpolated per equation (3) below.

$$RGB(X^{2D\_RGB}) = (1-t_1)*RGB(X_1^{2D\_RGB}) + RGB(X_2^{2D\_RGB}) \quad \text{Equation (2):}$$

$$RGB(X^{2D\_TOF}) = (1-t_2)*RGB(X_1^{2D\_TOF}) + RGB(X_2^{2D\_TOF}) \quad \text{Equation (3):}$$

In this embodiment, the depth value is first interpolated for each intermediate pixel on the depth map image, then the RGB values for all original and intermediate depth map pixels are interpolated by projecting the points from the depth map image onto the RGB image using the extrinsic and intrinsic matrices of the devices 12, 14. The computation cost may be higher than that of projective texture mapping on a central processing unit (CPU), but may be negligible on the GPU using render to texture (RTT) techniques.

Further, the depth value of the intermediate point may not be able to be linearly interpolated on the depth map image for the same reason as for perspective projection. Nonetheless, it has been proven that it may be possible to obtain suitable results by linearly interpolating the reciprocal of the depth value, per the equation:

$$Z(X^{2D\_TOF}) = \frac{1}{(1-t)*\frac{1}{Z(X_1^{2D\_TOF})} + \frac{1}{Z(X_2^{2D\_TOF})}}$$

4. Technical Implementation with OpenGL Texture and GLSL

The interpolation and transformation operations that have been described under the heading "3. Depth Map Image and RGB Image Registration" may be costly if computed on the CPU in a serial way. It has been found that one way to increase the speed is to employ streaming single instruction, multiple data extensions (SSE) which may be available on 86/84 machines, for example. It may be introduced as an extension to the normal CPU instruction set, which may considerably improve the computation performance when the same instruction is applied on multiple data sets. Since the image-transformation operations may be independent at the pixel level, the SSE may help to parallelize the process.

In this embodiment, the transformation operations are parallelized using OpenGL texture and GLSL. It has been shown that these operations can be conducted efficiently on the GPU and can achieve interactive frame rates.

4.a. Interpolation Using OpenGL Texture

Rendering the interpolated result to the frame buffer may be needed by the image registration methods set forth above. The method described under the heading "3.a. Image Registration Between Depth Map Image and Intensity Image" is taken as an example to demonstrate implementation.

Figure 3:
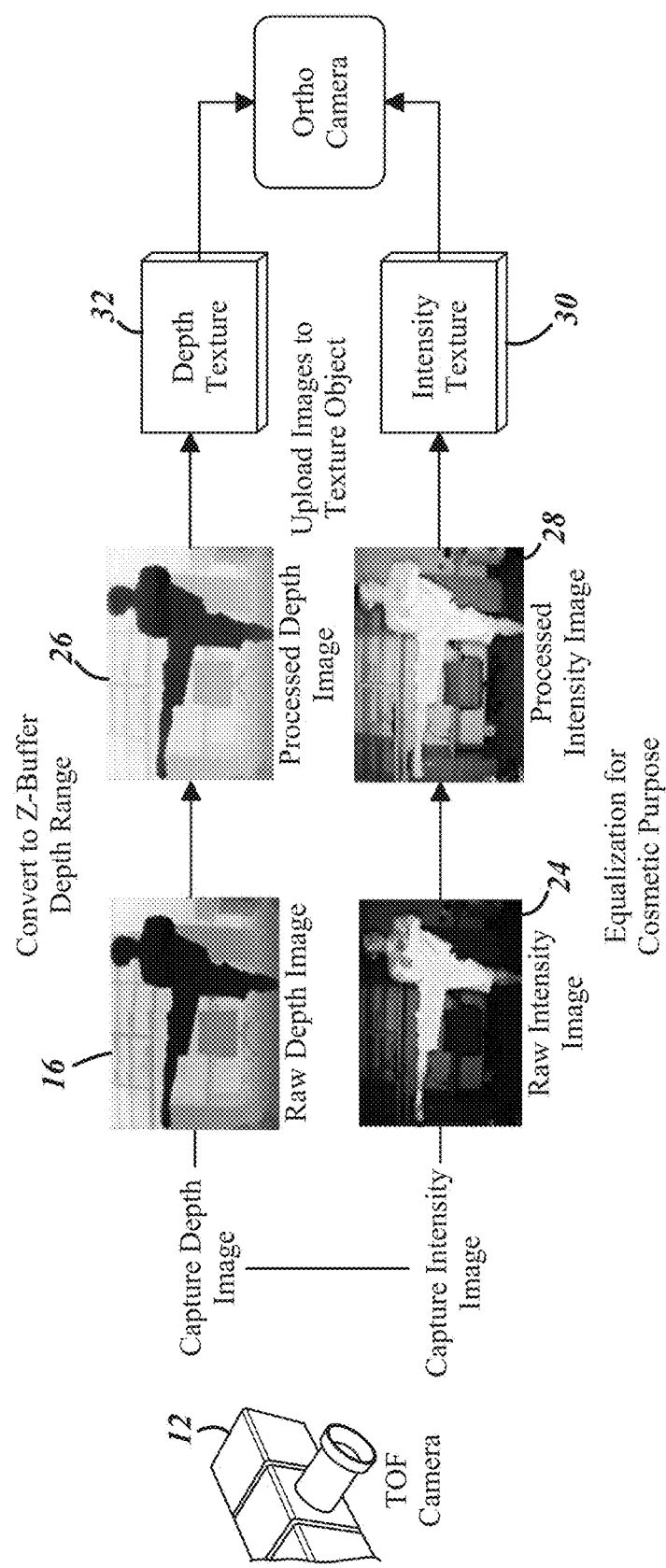
FIG. 3 is a diagrammatic representation of an embodiment of interpolation using Open Graphics Library (OpenGL) texture.

Referring to FIG. 3, after preprocessing, the depth map image 16 and intensity image 24 are ready to be written into the depth buffer and color buffer, respectively. The processed depth map image is represented in FIG. 3 by the numeral 26, and the processed intensity image is represented by the numeral 28. One challenge encountered is how to write to the frame buffers fast enough so that real-time rendering may be possible. The arbitrary size of the frame buffers may call for interpolation of the original 200×200 images. While some software interpolation can be slow, texture filtering may present a hardware solution since texture sampling is not uncommon and most GPUs implement it efficiently. Furthermore, even though the OpenGL command glDrawPixels( ) with GL_DEPTH_COMPONENT and GL_RGBA parameter provides an option for writing array into frame buffers, it has been found that no current OpenGL implementation may be able to efficiently accomplish this since data are passed from main memory to OpenGL, and then to a graphics card on every single frame. And this process is synchronous with CPU computation, since the CPU transfers the data. In other words, CPU cycles may be wasted during the data transfer, and the rendering frame rate may consequently be slower.

In contrast, texturing a quad and manipulating its depth and color values in the GLSL fragment shader can be efficient. In general, texture is a container of one or more images in OpenGL and is typically bound to a geometry. Moreover, a geometry can be associated with multiple textures. In this example, the OpenGL geometric primitive-type GL QUADS is chosen as binding target, and two 2D textures are pasted on it: an intensity image texture 30 and a depth map texture 32. The quad is projected orthogonally. During rasterisation, which is employed in this embodiment, the textures coordinate for each fragment (pixel) and are (bi)linearly interpolated according to the size of the OpenGL frame buffers.

4.a.i. Intensity Image Texture

In this example, since modifying the existing texture object on a fixed region of the GPU can be computationally cheaper than allocating a new one for each frame, it may be preferred in some cases to use glTexSubImage2D( ) to replace repeatedly the texture data with new captured intensity images. But the intensity image may have to be loaded to an initial and larger texture with size in both directions set to the next biggest power of two compared to its resolution (e.g., 256×256). Accordingly, in this example, the texture coordinates are assigned as (0, 0), (200/256, 0), (200/256, 200/256), and (0, 200/256) in counterclockwise order of the quad.

4.a.ii. Depth Map Texture

The same subimage replacement strategy may be applied on the depth map image. In this example, even though the internal format of the texture is set to GL_DEPTH_COMPONENT, the depth value written into the depth buffer is not the depth map texture value, and instead is the actual depth value of the quad geometry. Therefore, the depth value of the quad may have to be manipulated in the fragment shader according to the depth map texture value. In general, a fragment shader can operate on every fragment that is spawned by the rasterisation phase in the OpenGL pipeline. One input for the fragment processor may be interpolated texture coordinates, and the common end result of the fragment processor may be a color value and a depth for that fragment. The features may make it possible to alternate a polygon depth value so that the TOF depth map can be written into the depth buffer.

4.b. Homography Registration Using Render to Texture

In the homography registration implementation, an extra step beyond the description under the heading "4.a. Interpolation Using OpenGL Texture" may be interpolating a depth map image that has a one-to-one mapping relationship with the RGB image at the pixel level. As set forth under the heading "3.b. Image Registration Between Depth Map Image and RGB Image Using Homography," given a pixel on the RGB image, its correspondence point on the depth map image can be found through the pre-computed homography lookup table, and the depth value may be (bi)linearly interpolated from the closest four points. But since, in this example, the RGB camera has a resolution of 1,280×960, it implies 1,280×960 loops for each rendered frame if computed on the CPU and may slow down the rendering frame rate.

Further, since this type of pixel-by-pixel computation may be parallel, the computation performance can be boosted if it is carried out on the GPU. In order to enable computation on the GPU in this example, the procedure may involve: 1) uploading data to the GPU, 2) interpolation, and 3) transferring the result to the depth texture. In this embodiment, the render to texture (RTT) technique is employed for this procedure. The RTT technique can render a frame, with the rendering results being written to texture(s) instead of the frame buffers.

Figure 4:
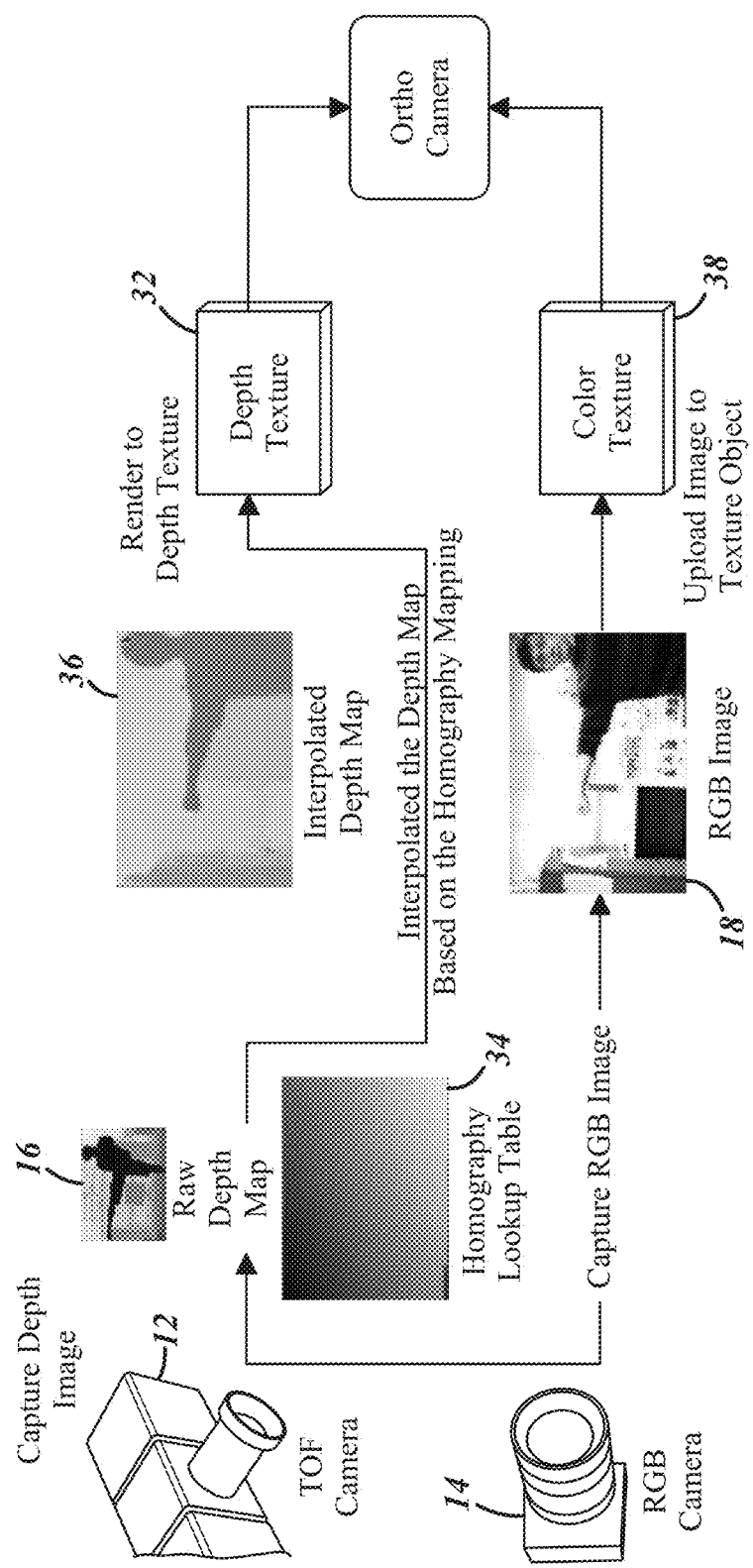
FIG. 4 is a diagrammatic representation of an embodiment of interpolation with homography registration using a render to texture (RTT) technique.

Referring to FIG. 4, first a homography lookup table 34 (e.g., 1,280×960) and the raw depth map 16 (e.g., 200×200) may be uploaded as textures. Second, a high resolution depth map 36 (e.g., 1,280×960) may be interpolated in the fragment shader and written to the depth texture 32. The depth texture 32 and RGB texture 38 (Color Texture in FIG. 4) may then be pasted to the quad geometry and rendered to the frame buffers in the description under the heading "4.a. Interpolation Using OpenGL Texture." In one specific example, on a Toshiba Qosmio X505 featuring Intel M450 with two cores and 2.4 GHz and a NVIDIA GeForce GTS 360M with 96 cores and 1436 MHz, the frame rate with major computation load on the GPU was found to be 1.5 times faster than the case with major load on the CPU. Indeed, in some examples it has been found that when the computation load is on the GPU, the frame rate may be primarily limited by the speed of retrieving images from the depth sensing device 12 and RGB image-capturing device 14.

4.c. Stereo Registration Using Render to Texture

A similar render to texture (RTT) technique may be used to assign RGB value to each pixel on the depth map image 16 through stereo registration. One difference is that instead of writing to one texture, here RTT writes to two targets: the depth texture 32 and RGB texture 38 at the same time.

Figure 5:
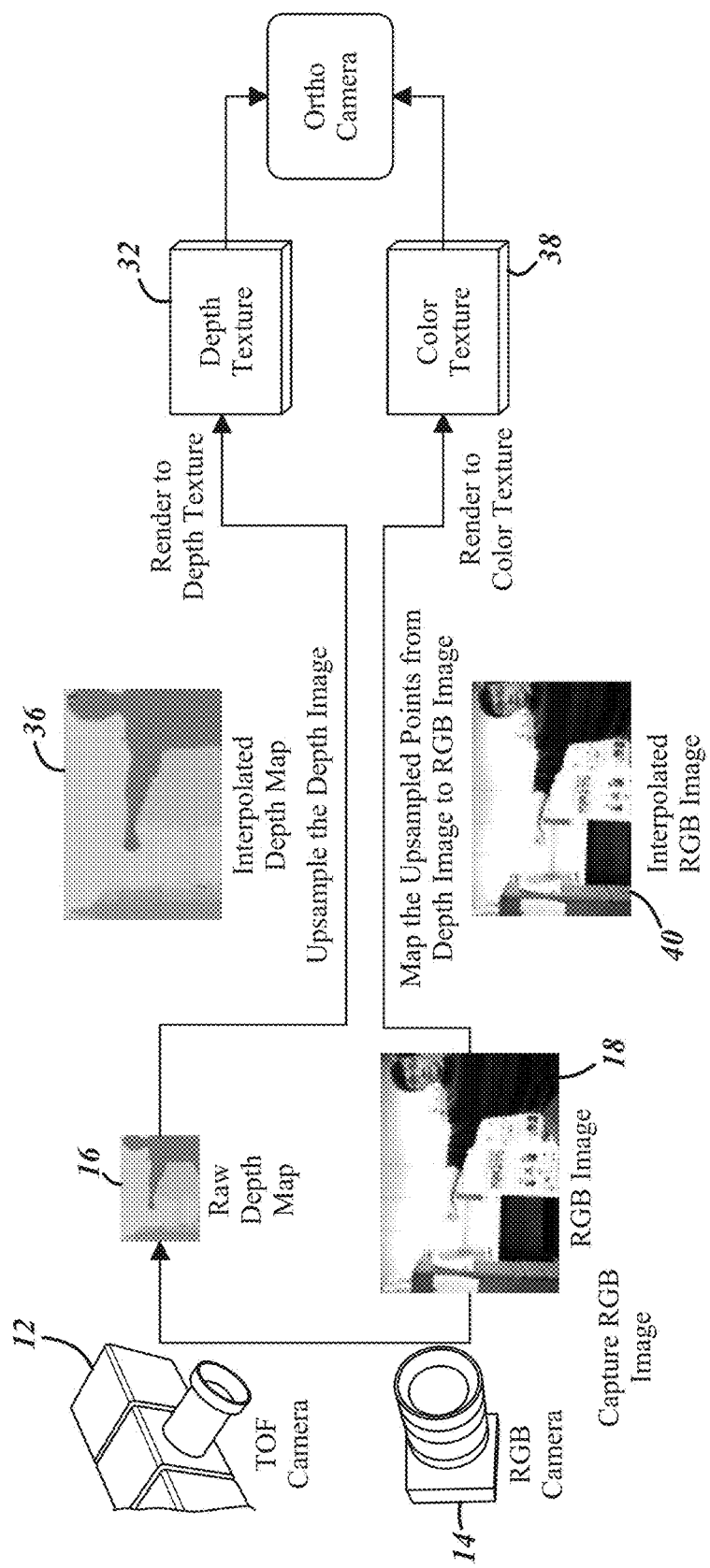
FIG. 5 is a diagrammatic representation of an embodiment of interpolation with stereo registration using a render to texture (RTT) technique.

Referring to FIG. 5, in this embodiment, first the raw depth map 16 (e.g., 200×200) and the raw RGB image 18 (e.g., 1,280×960) may be uploaded as textures. Second, for each fragment, its depth value is linearly interpolated as set forth under the heading "3.c.ii. Interpolate RGB Values for Intermediate Depth Map Image Pixels," and the associated RGB value is identified via stereo registration as set forth under the heading "3.c.i. Assign RGB Value to Depth Map Pixel" (the interpolated RGB image is represented in FIG. 5 by the numeral 40). The result of the depth values being linearly interpolated is pushed to the depth texture 32, and the result of the identified RGB values are pushed to the RGB texture 38. Lastly, these two textures are rendered to the frame buffers. In an example, if the TOF camera has a wider field of view than that of the RGB camera in the vertical direction, the bottom part of the depth map image may not be matched with any valid RGB value. The issue may be resolved in this example by clipping the invalid region of the RGB and depth textures.

Figure 7:
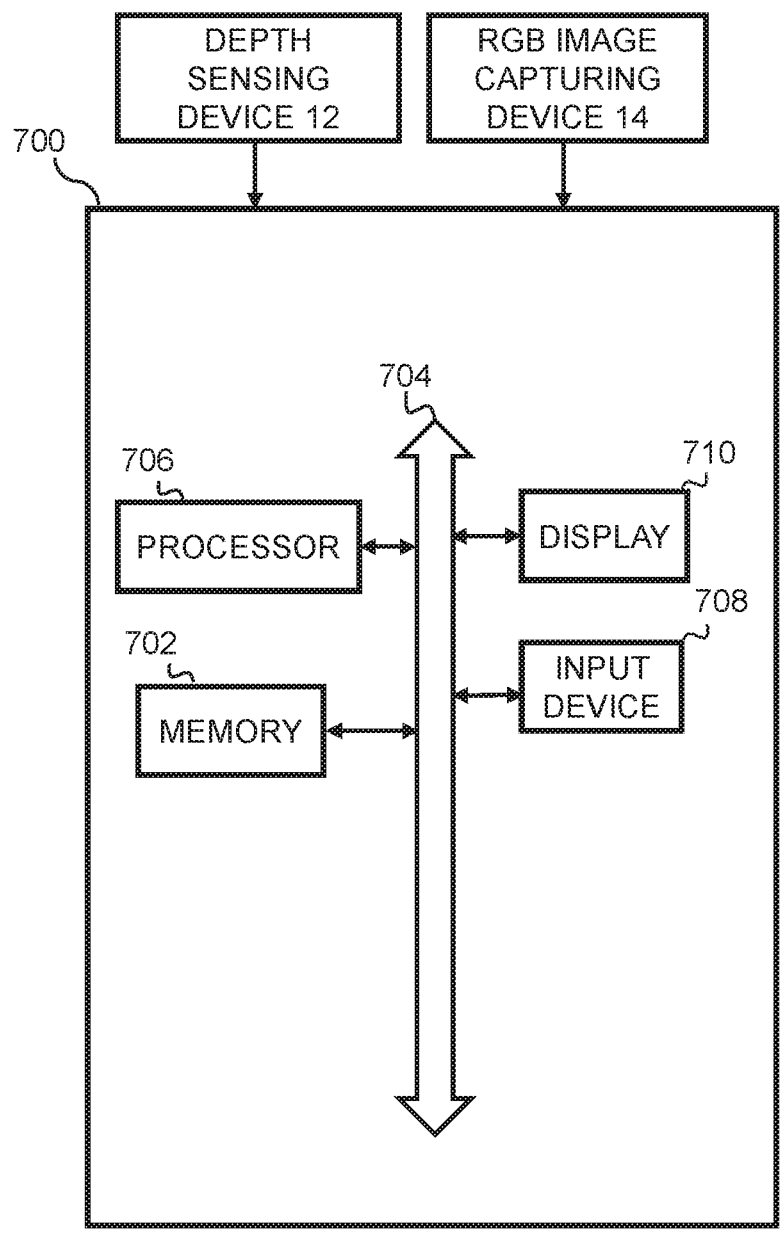
FIG. 7 illustrates an exemplary system for implementing the disclosed method.

FIG. 7 illustrates a general computer system 700, which may include instructions that when executed cause the computer system 700 to perform any one or more of the methods or computer-based functions disclosed herein. The computer system 700 may also be implemented as or incorporated into various devices, such as a personal computer or a mobile computing device capable of executing a set of instructions that specify actions to be taken by that device. The computer system 700 may include a memory 702 on a bus 704 for communicating information. Code operable to cause the computer system to perform any of the acts or operations described herein may be stored in the memory 702. The memory 702 may be a random-access memory, read-only memory, programmable memory, hard disk drive or any other type of volatile or non-volatile memory or storage device. The computer system 700 may include a processor 706, such as a central processing unit (CPU) and/or a graphics processing unit (GPU). The processor 706 may include one or more general processors, digital signal processors, application specific integrated circuits, field programmable gate arrays, digital circuits, optical circuits, analog circuits, combinations thereof, for analyzing and processing data. The instructions may reside completely, or at least partially, within the memory 702 and/or within the processor 706 during execution by the computer system 700. Additionally, the computer system 700 may include an input device 708, such as a keyboard or mouse, configured for a user to interact with any of the components of system 700. It may further include a display 710, such as a liquid crystal display (LCD), a cathode ray tube (CRT), or any other display suitable for conveying information.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of blending at least one virtual construction jobsite object and at least one real construction jobsite object in a dynamic augmented reality scene of a construction jobsite in real-time, the method comprising the steps of:
   (a) capturing a depth map image of the construction jobsite and of the at least one real construction jobsite object via a depth sensing device;
   (b) capturing a red, green, and blue (RGB) image of the construction jobsite and of the at least one real construction jobsite object via an RGB image-capturing device;
   (c) registering the depth map image and the RGB image of the construction jobsite and of the at least one real construction jobsite object to a common coordinate system;
   (d) projecting the at least one virtual construction jobsite object in a scene of the construction jobsite using geographical information system (GIS) data, computer-aided design (CAD) data, or both GIS data and CAD data, in order to generate the augmented reality scene of the construction jobsite; and
   (e) removing hidden surfaces of the at least one virtual construction jobsite object in the augmented reality scene of the construction jobsite based on depth distance data of the depth map image of the at least one real construction jobsite object, and based on the GIS data, CAD data, or both of the projected at least one virtual construction jobsite object.

2. The method of claim 1, wherein the augmented reality scene of the construction jobsite with the projected at least one virtual construction jobsite object and removed hidden surfaces is displayed within a cabin of a piece of construction equipment for availability to an operator of the piece of construction equipment.

3. The method of claim 1, wherein the construction jobsite is an excavation jobsite, and the at least one real construction jobsite object includes a piece of construction equipment, a building structure, a worker, or a combination of these.

4. The method of claim 1, wherein the at least one virtual construction jobsite object includes a buried utility, a building structure, a piece of construction equipment, or a combination of these.

5. The method of claim 1, further comprising writing the depth distance data of the depth map image to a depth buffer.

6. The method of claim 5, wherein the depth distance data of the depth map image is transformed to obtain normalized device coordinates before the depth distance data is written to the depth buffer.

7. The method of claim 1, further comprising writing RGB data of the RGB image to a color buffer.

8. The method of claim 1, further comprising determining a corresponding point on the RGB image for each pixel of the depth map image.

9. The method of claim 8, further comprising determining the corresponding point by using an intrinsic matrix of the depth sensing device and by using a depth distance value of each pixel of the depth map image.

10. The method of claim 9, further comprising determining the corresponding point by using relative rotation and translation from the depth map image to the RGB image.

11. The method of claim 10, determining the corresponding point by using an intrinsic matrix of the RGB image-capturing device.

12. The method of claim 1, further comprising interpolating corresponding points on the RGB image for intermediate pixels of the depth map image.

13. The method of claim 12, wherein interpolating the corresponding points further comprises interpolating depth distances of the intermediate pixels on the depth map image.

14. The method of claim 13, wherein interpolating the corresponding points further comprises, after the depth distances of the intermediate pixels are interpolated on the depth map image, interpolating corresponding points on the RGB image for the intermediate pixels and non-intermediate pixels of the depth map image.

15. The method of claim 12, wherein step (c) of registering and the step of interpolating are carried out in parallel on a graphics processing unit (GPU).

16. The method of claim 1, wherein step (c) of registering involves rendering to a texture.

17. The method of claim 1, wherein the depth sensing device is a time-of-flight camera.

18. The method of claim 1, wherein the at least one virtual construction jobsite object is a static object, a dynamic object, or a static object and a dynamic object.

19. The method of claim 18, wherein the static object is a buried utility, and the dynamic object is a piece of construction equipment.

20. A non-transitory computer readable medium comprising a non-transient data storage device having stored thereon instructions that carry out the method of claim 1.

* * * * *